(12) United States Patent
Hatazaki et al.

(10) Patent No.: US 11,362,355 B2
(45) Date of Patent: Jun. 14, 2022

(54) FUEL CELL SYSTEM AND ANODE OFF-GAS DISCHARGE AMOUNT ESTIMATION SYSTEM

(71) Applicant: TOYOTA JIDOSHA KABUSHIKI KAISHA, Toyota (JP)

(72) Inventors: Miho Hatazaki, Nisshin (JP); Kazuo Yamamoto, Toyota (JP); Shigeki Hasegawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 138 days.

(21) Appl. No.: 16/944,291

(22) Filed: Jul. 31, 2020

(65) Prior Publication Data
US 2021/0075043 A1 Mar. 11, 2021

(30) Foreign Application Priority Data
Sep. 6, 2019 (JP) .............................. JP2019-162718

(51) Int. Cl.
*H01M 8/04* (2016.01)
*H01M 8/04746* (2016.01)
*H01M 8/04119* (2016.01)

(52) U.S. Cl.
CPC ... *H01M 8/04753* (2013.01); *H01M 8/04164* (2013.01); *H01M 8/04783* (2013.01); *H01M 2250/20* (2013.01)

(58) Field of Classification Search
CPC ......... H01M 8/04164; H01M 8/04753; H01M 8/04783
USPC ....................................................... 429/444
See application file for complete search history.

(56) References Cited

U.S. PATENT DOCUMENTS

| | | | | |
|---|---|---|---|---|
| 2011/0183226 A1* | 7/2011 | Nishiyama | ............ | H01M 12/08 429/450 |
| 2012/0276461 A1* | 11/2012 | Baur | ................. | H01M 8/04164 429/410 |
| 2013/0133759 A1* | 5/2013 | Kato | .................... | H01M 8/2457 137/488 |
| 2016/0133972 A1 | 5/2016 | Yamamoto et al. | | |
| 2017/0373336 A1* | 12/2017 | Hayashi | .............. | H01M 8/0254 |

FOREIGN PATENT DOCUMENTS

JP 2016103466 A 6/2016

OTHER PUBLICATIONS

Miho Hatazaki et al., U.S. Appl. No. 16/928,103, for Fuel Cell System, filed Jul. 14, 2020.

* cited by examiner

*Primary Examiner* — James M Erwin
(74) *Attorney, Agent, or Firm* — Dickinson Wright, PLLC (57) ABSTRACT

A fuel cell system includes a fuel cell, a supply flow passage and a discharge flow passage for anode gas, a gas-liquid separator, a discharge valve, a differential pressure detection unit configured to detect a differential pressure between an upstream side and a downstream side of the discharge valve, and a control unit. The control unit is configured to estimate an effective cross-sectional area of the discharge valve for the anode off-gas, which is decreased by an amount of water flowing into the gas-liquid separator and flowing out from the discharge valve, based on the differential pressure, and to estimate a discharge amount of the anode off-gas based on the estimated effective cross-sectional area.

8 Claims, 7 Drawing Sheets

FUEL CELL SYSTEM AND ANODE OFF-GAS DISCHARGE AMOUNT ESTIMATION SYSTEM

INCORPORATION BY REFERENCE

The disclosure of Japanese Patent Application No. 2019-162718 filed on Sep. 6, 2019 including the specification, drawings and abstract is incorporated herein by reference in its entirety.

BACKGROUND

1. Technical Field

The present disclosure relates to a fuel cell system and a method for estimating a discharge amount of anode off-gas in a fuel cell system.

2. Description of Related Art

Japanese Unexamined Patent Application Publication No. 2016-103466 (JP 2016-103466 A) describes a fuel cell system including a gas-liquid separator that separates water from anode off-gas discharged from a fuel cell and stores the water, a discharge flow passage that is connected to the gas-liquid separator and discharges to the outside the stored water in the gas-liquid separator and the anode off-gas, and a discharge valve provided in the discharge flow passage. In this system, after discharge of the stored water in the gas-liquid separator is completed, a discharge amount of the anode off-gas is estimated, based on a differential pressure between an upstream side and a downstream side of the discharge valve and a ratio of anode off-gas in a discharge port of the discharge valve, which is obtained by subtracting a ratio of water. The amount of stored water in the gas-liquid separator is calculated from an amount of electric power generated by the fuel cell, and the completion of the discharge of the stored water is estimated using the calculated amount of the stored water and the differential pressure.

SUMMARY

In the system described in JP 2016-103466 A, after the discharge of the stored water in the gas-liquid separator is completed, the discharge amount of the anode off-gas is estimated using the ratio of anode off-gas in the discharge port of the discharge valve based on the following viewpoints. That is, if an amount of water generated based on the power generation of the fuel cell is large even after the completion of discharge of the stored water in the gas-liquid separator, the generated water and the anode off-gas may simultaneously flow out from the discharge valve. However, the inventors have found that not all the water generated based on the power generation flows into the gas-liquid separator but part of the water may remain in the discharge flow passage and the like. Therefore, in consideration of such a case, a technique for improving estimation accuracy of the discharge amount of the anode off-gas is desired.

The present disclosure can be embodied in the following aspects.

An aspect of the disclosure relates to a fuel cell system. The fuel cell system includes a fuel cell, a supply flow passage, a discharge flow passage, a gas-liquid separator, a discharge valve, a differential pressure detection unit, and a control unit. The fuel cell is configured to be supplied with anode gas and cathode gas to generate electric power. The supply flow passage connects a supply source of the anode gas with the fuel cell and is configured such that the anode gas flows through the supply flow passage. The discharge flow passage is connected to the fuel cell and is configured such that the fuel cell communicates with an outside of the fuel cell system through the discharge flow passage and anode off-gas discharged from the fuel cell flows through the discharge flow passage. The gas-liquid separator is provided on the discharge flow passage and is configured to separate water from the anode off-gas and store the water. The discharge valve is provided on a portion of the discharge flow passage, which is downstream of the gas-liquid separator, and has a predetermined flow passage cross-sectional area when the discharge valve is opened. The differential pressure detection unit is configured to detect a differential pressure between an upstream side and a downstream side of the discharge valve. The control unit is configured to perform an estimation process of estimating an effective cross-sectional area of the discharge valve for the anode off-gas based on the differential pressure and estimating a discharge amount of the anode off-gas discharged from the discharge valve based on the effective cross-sectional area. The effective cross-sectional area is decreased by an amount of water flowing into the gas-liquid separator and flowing out from the discharge valve. With the above aspect, the effective cross-sectional area of the discharge valve for the anode off-gas, which is decreased by the amount of water flowing into the gas-liquid separator and flowing out from the discharge valve, is estimated based on the differential pressure between the upstream side and the downstream side of the discharge valve, and the discharge amount of the anode off-gas is estimated using the estimated effective cross-sectional area. Therefore, the discharge amount of the anode off-gas is calculated taking into consideration the water remaining in the discharge flow passage on the upstream side of the discharge valve and the like. Thus, it is possible to improve estimation accuracy of the discharge amount of the anode off-gas.

In the above aspect, the control unit may be configured to obtain a first coefficient for correcting the flow passage cross-sectional area based on a predetermined first relationship among a speed of water flowing into the gas-liquid separator from the discharge flow passage, which is calculated based on an amount of electric power generated by the fuel cell, the differential pressure, and a ratio of the flow passage cross-sectional area in which the anode off-gas flows, and to estimate the effective cross-sectional area by correcting the flow passage cross-sectional area with the first coefficient. With the aspect, the effective cross-sectional area for the anode off-gas can be estimated by obtaining the first coefficient corresponding to the ratio of the flow passage cross-sectional area in which the anode off-gas flows, which is estimated using the speed of water flowing into the gas-liquid separator and the differential pressure.

In the above aspect, the control unit may be configured to obtain a second coefficient for correcting the flow passage cross-sectional area based on a predetermined second relationship between an amount of water stored in the gas-liquid separator and the ratio of the flow passage cross-sectional area in which the anode off-gas flows, and to estimate the effective cross-sectional area by correcting the flow passage cross-sectional area with the first coefficient and the second coefficient. With the aspect, the effective cross-sectional area for the anode off-gas is estimated by obtaining the first coefficient and the second coefficient that is estimated using the amount of water stored in the gas-liquid separator, and the discharge amount of the anode off-gas is estimated using the estimated effective cross-sectional area. Thus, the fact that the water stored in the gas-liquid separator is discharged together with the anode off-gas is taken into consideration. Therefore, it is possible to improve the estimation accuracy of the discharge amount of the anode off-gas.

In the above aspect, the control unit may be configured to calculate the amount of water stored in the gas-liquid separator based on the amount of electric power generated by the fuel cell and a discharge speed at which the water stored in the gas-liquid separator is discharged from the gas-liquid separator, the discharge speed being associated with the differential pressure. With the aspect, it is possible to calculate the amount of the stored water using the amount of water generated based on power generation and the discharge speed associated with the differential pressure to obtain the second coefficient and estimate the discharge amount of the anode off-gas.

In the above aspect, the control unit may be configured to estimate the discharge amount of the anode off-gas using the flow passage cross-sectional area as the effective cross-sectional area when the differential pressure is equal to or higher than a predetermined threshold in the estimation process. With the aspect, when the differential pressure is equal to or higher than the threshold, the discharge amount of the anode off-gas is estimated using the flow passage cross-sectional area as the effective cross-sectional area, without taking the differential pressures into consideration. Thus, it is possible to further improve the estimation accuracy of the discharge amount of the anode off-gas.

In the above aspect, the control unit may be configured to continuously perform the estimation process from a time when the discharge valve is opened to a time when the discharge valve is closed. With the aspect, the estimation process is continuously performed from the time when the discharge valve is opened to the time when the discharge valve is closed. Therefore, the discharge amount of the anode off-gas is estimated taking into consideration the amount of the anode off-gas discharged together with the stored water in the gas-liquid separator before the discharge of the stored water in the gas-liquid separator is completed. Thus, it is possible to improve the estimation accuracy of the discharge amount of the anode off-gas, compared to the case where the discharge amount of the anode off-gas is calculated after the discharge of the water stored in the gas-liquid separator is completed.

In the above aspect, the control unit may be configured to close the discharge valve when a total of the estimated discharge amount of the anode off-gas becomes equal to or larger than a target value after the discharge valve is opened. With the aspect, a target amount of anode off-gas can be discharged.

A second aspect of the disclosure relates to a method for estimating a discharge amount of anode off-gas in a fuel cell systems. The fuel cell system includes: a fuel cell configured to be supplied with anode gas and cathode gas to generate electric power; a supply flow passage connecting a supply source of the anode gas with the fuel cell and configured such that the anode gas flows through the supply flow passage; a discharge flow passage connected to the fuel cell and configured such that the fuel cell communicates with an outside of the fuel cell system through the discharge flow passage and anode off-gas discharged from the fuel cell flows through the discharge flow passage; a gas-liquid separator provided on the discharge flow passage and configured to separate water from the anode off-gas and store the water; and a discharge valve provided on a portion of the discharge flow passage, which is downstream of the gas-liquid separator, and having a predetermined flow passage cross-sectional area when the discharge valve is opened. The method includes obtaining a differential pressure between an upstream side and a downstream side of the discharge valve, and estimating an effective cross-sectional area of the discharge valve for the anode off-gas based on the differential pressure and estimating a discharge amount of the anode off-gas discharged from the discharge valve based on the effective cross-sectional area, the effective cross-sectional area being decreased by an amount of water flowing into the gas-liquid separator and flowing out from the discharge valve. With the aspect, the effective cross-sectional area of the discharge valve for the anode off-gas, which is decreased by the amount of water flowing into the gas-liquid separator and flowing out from the discharge valve, is estimated based on the differential pressure between the upstream side and the downstream side of the discharge valve, and the discharge amount of the anode off-gas is estimated using the estimated effective cross-sectional area. Therefore, the discharge amount of the anode off-gas is calculated taking into consideration the water remaining in the discharge flow passage on the upstream side of the discharge valve and the like. Thus, it is possible to improve estimation accuracy of the discharge amount of the anode off-gas.

The present disclosure can be implemented in various modes other than the above-described fuel cell system and the method for estimating a discharge amount of anode off-gas. For example, the present disclosure can be implemented in the modes of a method of opening and closing a discharge valve in a fuel cell system, a method of controlling a fuel cell system using the method of opening and closing a discharge valve, a vehicle including a fuel cell system, and the like.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

1. First Embodiment

Figure 1:
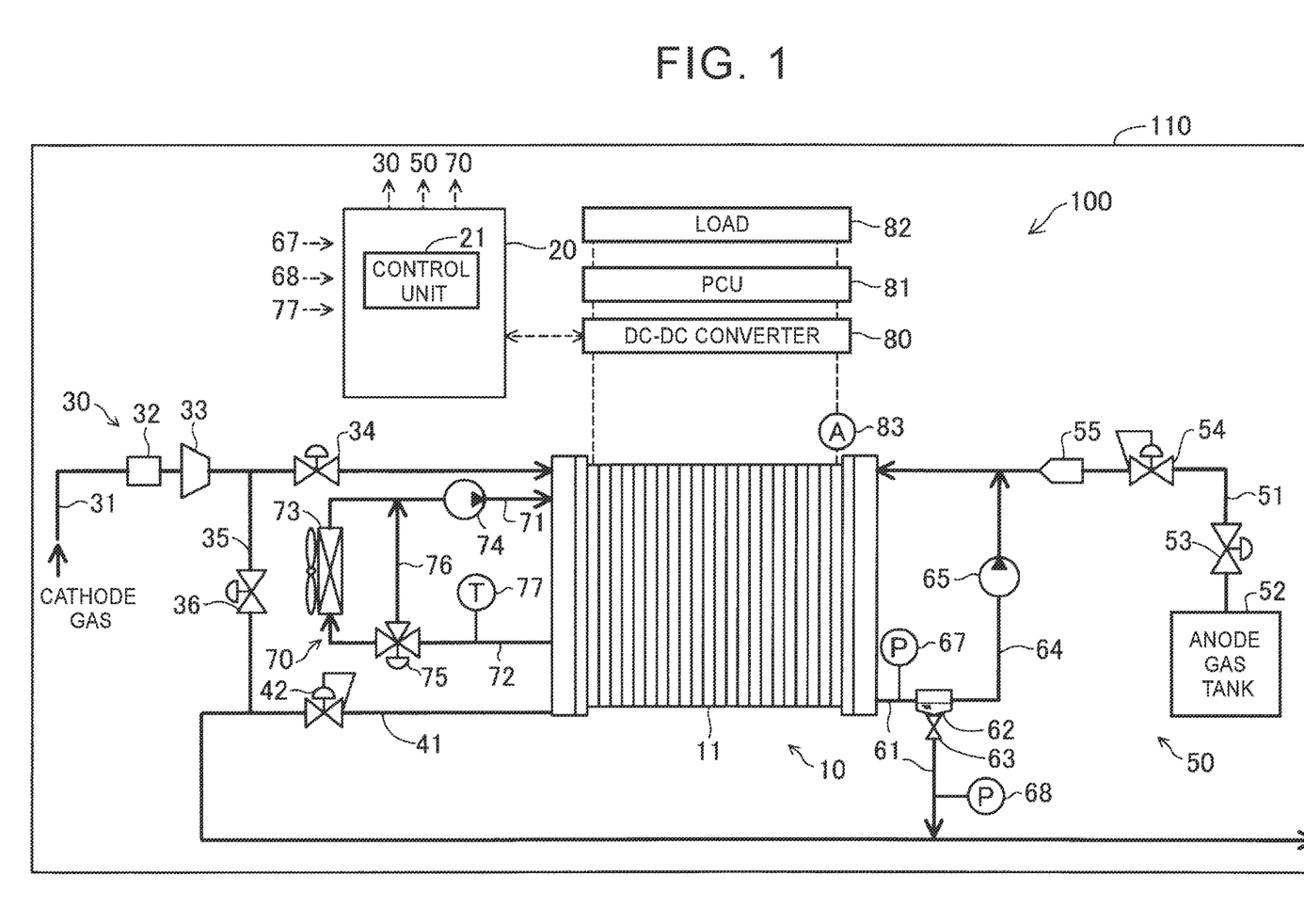
FIG. 1 is a schematic configuration diagram of a fuel cell system.

FIG. 1 is a schematic configuration diagram of a fuel cell system 100 serving as an embodiment of the present disclosure. The fuel cell system 100 is mounted on a vehicle 110 and outputs electric power serving as a power source for the vehicle 110 in response to a request from a driver.

The fuel cell system 100 includes a fuel cell stack 10, a control device 20, a cathode gas supply/discharge unit 30, an anode gas supply/discharge unit 50, a coolant circulation unit 70, a direct current-direct current (DC-DC) converter 80, a power control unit (hereinafter, referred to as "PCU") 81, and a load 82. The control device 20 is an electronic control unit (ECU) including a central processing unit (CPU), a memory, and an interface, and functions as a control unit 21 by deploying and executing programs stored in the memory.

The fuel cell stack 10 is composed of stacked fuel cells 11. Each fuel cell 11 includes a membrane electrode assembly having an electrolyte membrane, anode and cathode electrodes disposed on opposite surfaces of the electrolyte membrane, and a set of separators sandwiching the membrane electrode assembly, and is supplied with anode gas and cathode gas to generate electric power. The anode gas is, for example, hydrogen, and the cathode gas is, for example, air.

The cathode gas supply/discharge unit 30 includes a cathode gas pipe 31, an air flow meter 32, a cathode gas compressor 33, a first on-off valve 34, a bypass pipe 35, a flow dividing valve 36, a cathode off-gas pipe 41, and a first regulator 42.

The air flow meter 32 is provided on the cathode gas pipe 31 and measures a flow rate of air taken therein. The cathode gas compressor 33 is connected to the fuel cell stack 10 via the cathode gas pipe 31. The cathode gas compressor 33 is controlled by the control unit 21 to compress the cathode gas taken therein from the outside and supply the compressed cathode gas to the fuel cell stack 10.

The first on-off valve 34 is provided between the cathode gas compressor 33 and the fuel cell stack 10, and is controlled by the control unit 21 to open and close. The bypass pipe 35 is a pipe that connects a portion of the cathode gas pipe 31 between the cathode gas compressor 33 and the first on-off valve 34 with a portion of the cathode off-gas pipe 41 downstream of the first regulator 42. The flow dividing valve 36 is provided in the bypass pipe 35, and is controlled by the control unit 21 to adjust the flow rate of air to the fuel cell stack 10 and the cathode off-gas pipe 41.

The cathode off-gas pipe 41 discharges the cathode off-gas discharged from the fuel cell stack 10 to the outside of the fuel cell system 100. The first regulator 42 is controlled by the control unit 21 to adjust a pressure at a cathode gas outlet of the fuel cell stack 10.

The anode gas supply/discharge unit 50 includes an anode gas pipe 51, an anode gas tank 52, a second on-off valve 53, a second regulator 54, an injector 55, an anode off-gas pipe 61, a gas-liquid separator 62, a discharge valve 63, a circulation pipe 64, an anode gas pump 65, a first pressure sensor 67, and a second pressure sensor 68.

The anode gas pipe 51 is a supply flow passage for supplying anode gas to the fuel cell stack 10. The anode gas tank 52 is connected to an anode gas inlet of the fuel cell stack 10 via the anode gas pipe 51, and supplies anode gas in the anode gas tank 52 to the fuel cell stack 10. The anode gas tank 52 is also referred to as "anode gas supply source". The second on-off valve 53, the second regulator 54, and the injector 55 are provided on the anode gas pipe 51 in this order from an upstream side, that is, from a side closer to the anode gas tank 52. The second on-off valve 53 is controlled by the control unit 21 to open and close. The second regulator 54 is controlled by the control unit 21 to adjust the pressure of the anode gas on the upstream side of the injector 55. The injector 55 is an on-off valve that is electromagnetically driven in accordance with a drive cycle and a valve opening time set by the control unit 21, and adjusts the amount of anode gas supplied to the fuel cell stack 10. A plurality of the injectors 55 may be provided on the anode gas pipe 51. Note that the injector 55, the second regulator 54, and the second on-off valve 53 can be construed as "anode gas supply source".

The anode off-gas pipe 61 is connected to an anode off-gas outlet of the fuel cell stack 10 and allows the fuel cell stack 10 to communicate with the outside of the fuel cell system 100. The anode off-gas pipe 61 is a discharge flow passage through which the anode off-gas discharged from the fuel cell stack 10 flows. The gas-liquid separator 62 is provided on the anode off-gas pipe 61. The gas-liquid separator 62 separates water from anode off-gas including anode gas, nitrogen gas, and the like that have not been used in the power generation reaction, and stores the water.

The discharge valve 63 is an on-off valve provided vertically below the gas-liquid separator 62 on the anode off-gas pipe 61 and is configured to have a predetermined flow passage cross-sectional area when the valve is opened. The discharge valve 63 is controlled by the control unit 21 to open and close. When the discharge valve 63 is opened, water in the gas-liquid separator 62 and anode off-gas flow out from the discharge valve 63. The water and the anode off-gas that flowed out are discharged to the outside through the cathode off-gas pipe 41. When the discharge valve 63 is closed, the anode gas is consumed by power generation, but impurities other than the anode gas are not consumed. The impurities include, for example, nitrogen permeated from the cathode side to the anode side. Thus, an impurity concentration in the anode off-gas gradually increases. At this time, when the discharge valve 63 is opened, the anode off-gas is discharged to the outside of the fuel cell system 100 together with the cathode off-gas. While the discharge valve 63 is opened, the injector 55 continues to supply anode gas so that an anode gas concentration downstream of the injector 55 gradually increases.

The circulation pipe 64 is a pipe connecting the gas-liquid separator 62 and a portion of the anode gas pipe 51 downstream of the injector 55. The anode gas pump 65 is provided on the circulation pipe 64. The anode gas pump 65 is driven by the control of the control unit 21, and sends out, to the anode gas pipe 51, the anode off-gas from which water is separated by the gas-liquid separator 62. In the fuel cell system 100, the anode off-gas containing the anode gas is circulated and supplied to the fuel cell stack 10 again, thereby improving a utilization efficiency of the anode gas. The circulation pipe 64 also functions as a supply flow passage for supplying anode gas to the fuel cell stack 10.

The first pressure sensor 67 is provided on a portion of the anode off-gas pipe 61 on the upstream side of the discharge valve 63. The first pressure sensor 67 only need to be provided in any of a portion of the anode gas pipe 51 on the downstream side of the injector 55, the portion of the anode off-gas pipe 61 upstream of the discharge valve 63, and the circulation pipe 64. The second pressure sensor 68 is provided on a portion of the anode off-gas pipe 61 downstream of the discharge valve 63. A measurement value of the first pressure sensor 67 is also referred to as "first pressure value $P_1$", and a measurement value of the second pressure sensor 68 is also referred to as "second pressure value $P_2$". The first pressure sensor 67 and the second pressure sensor 68 transmit the first pressure value $P_1$ and the second pressure value $P_2$, respectively, to the control unit 21. The first pressure sensor 67 and the second pressure sensor 68 function as a differential pressure detection unit.

The coolant circulation unit 70 includes a coolant supply pipe 71, a coolant discharge pipe 72, a radiator 73, a coolant pump 74, a three-way valve 75, a bypass pipe 76, and a temperature sensor 77. The coolant circulation unit 70 adjusts a temperature of the fuel cell stack 10 by circulating the coolant in the fuel cell stack 10. As the coolant, for example, water, ethylene glycol, air, or the like is used.

The coolant supply pipe 71 is connected to a coolant inlet of the fuel cell stack 10, and the coolant discharge pipe 72 is connected to a coolant outlet of the fuel cell stack 10. The radiator 73 is connected to the coolant discharge pipe 72 and the coolant supply pipe 71. The radiator 73 uses air from an electric fan or the like to cool the coolant flowing in from the coolant discharge pipe 72 and then discharges the coolant to the coolant supply pipe 71. The coolant pump 74 is provided on the coolant supply pipe 71 and pressurizes and feeds the coolant to the fuel cell stack 10. The three-way valve 75 is controlled by the control unit 21 to adjust the flow rate of the coolant to the radiator 73 and the bypass pipe 76. The temperature sensor 77 measures the temperature of the coolant discharged from the fuel cell stack 10 and transmits the measurement value to the control unit 21.

The DC-DC converter 80 boosts an output voltage of the fuel cell stack 10 and supplies the voltage to the PCU 81. The PCU 81 includes an inverter, and is controlled by the control unit 21 to supply electric power to the load 82 via the inverter. Electric power of the fuel cell stack 10 and a secondary battery (not shown) is supplied to the load 82 such as a traction motor (not shown) for driving vehicle wheels (not shown), the cathode gas compressor 33, the anode gas pump 65, and various valves via a power supply circuit including the PCU 81. A current sensor 83 measures an output current value of the fuel cell stack 10 and transmits the measurement value to the control unit 21.

The control unit 21 controls various components of the fuel cell system 100 in accordance with power demands, and controls the output of the fuel cell stack 10. The power demands includes an external power generation demand from a driver of the vehicle 110 on which the fuel cell system 100 is mounted or the like and an internal power generation demand for supplying electric power to accessories and the like of the fuel cell system 100. The external power generation demand increases as an amount of depression of an accelerator pedal (not shown) of the vehicle 110 increases.

The control unit 21 performs an opening/closing process of opening the discharge valve 63 when a condition for opening the discharge valve 63 is satisfied and closing the discharge valve 63 when a condition for closing the discharge valve 63 is satisfied. The valve opening condition is, for example, that the amount of the stored water in the gas-liquid separator 62 has reached a specified value, or that a nitrogen concentration on the downstream side of the injector 55 has reached a specified value. The amount of the stored water in the gas-liquid separator 62 and the nitrogen concentration on the downstream side of the injector 55 while the discharge valve 63 is closed are calculated based on, for example, the amount of electric power generated by the fuel cell stack 10. The valve closing condition is that a total of a discharge amount of anode off-gas discharged from the discharge valve 63 has reached a target value. The target value of the discharge amount of the anode off-gas is determined based on the nitrogen concentration in the anode off-gas, which should be reduced.

The control unit 21 performs an estimation process of estimating the amount of anode off-gas discharged from the discharge valve 63. In the estimation process, the control unit 21 estimates, from the differential pressure, an effective cross-sectional area of the discharge valve 63 for the anode off-gas, which is decreased by an amount of water flowing into the gas-liquid separator 62 and flowing out of the discharge valve 63. The control unit 21 estimates an anode off-gas discharge amount Q per unit time by the following equation (1) using the estimated effective cross-sectional area. The control unit 21 estimates a total of the discharge amount (total discharge amount) of the anode off-gas by adding up the anode off-gas discharge amount Q per unit time since the discharge valve 63 is opened.

$$Q = \frac{(AK_1K_2)P_1}{\sqrt{RT_0}} H1 \qquad \text{Equation (1)}$$

In the equation (1), Q, A, $K_1$, $K_2$, $P_1$, R, $T_0$, and H1 are as follows:
Q (mol/sec): anode off-gas discharge amount per unit time
A ($m^2$): flow passage cross-sectional area of the discharge valve 63
$K_1$: first coefficient
$K_2$: second coefficient
$P_1$ ($P_a$): first pressure value
R (J/Kg·K): gas constant
$T_0$ (K): temperature
H1: anode off-gas coefficient
Although the details will be described later, in the present embodiment, a value ($A \cdot K_1 \cdot K_2$) corrected for the flow passage cross-sectional area A by multiplying the flow passage cross-sectional area A by the first coefficient $K_1$ and the second coefficient $K_2$ is the effective cross-sectional area for the anode off-gas. In the present embodiment, the temperature $T_0$ is a measurement value of the temperature sensor 77. In another embodiment, the temperature $T_0$ may be a temperature of anode gas and cathode gas supplied to the fuel cell stack 10, or a temperature of the anode off-gas. The temperature of the anode off-gas can be measured, for example, by providing the temperature sensor 77 on the portion of the anode off-gas pipe 61 on the upstream side of the discharge valve 63. Symbol H1 represents a correction term for the anode off-gas discharge amount Q that varies depending on gas properties of the anode off-gas, and is calculated by the following equation (2) in the present embodiment. In another embodiment, the correction term H1 may be 1.

$$H1 = \sqrt{\frac{2\gamma}{\gamma-1}\left\{\left(\frac{P_2}{P_1}\right)^{\frac{2}{\gamma}} - \left(\frac{P_2}{P_1}\right)^{\frac{\gamma+1}{\gamma}}\right\}} \qquad \text{Equation (2)}$$

In the equation (2), $P_2$ ($P_a$) is a second pressure value, and $\gamma$ is a specific heat ratio of the anode off-gas. The specific heat ratio $\gamma$ may be a specific heat ratio of the anode gas supplied to the fuel cell stack 10, or may be a specific heat ratio of a combined gas of the anode gas and the cathode gas.

Figure 2:
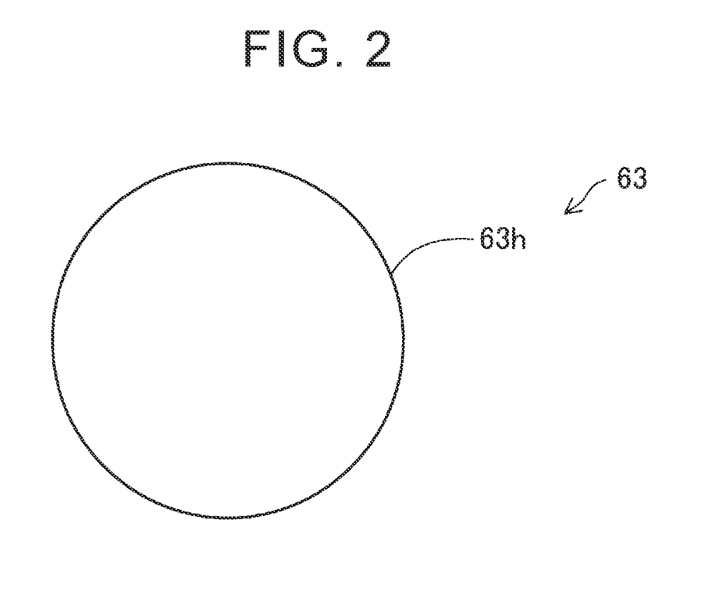
FIG. 2 shows an example of an image of a flow passage cross section of a discharge valve after the discharge valve is opened.
Figure 3:
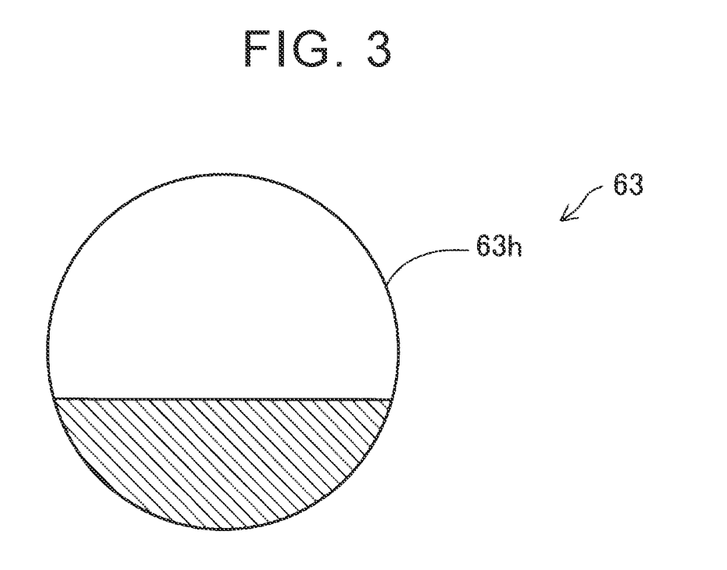
FIG. 3 shows another example of the image of the flow passage cross section of the discharge valve after the discharge valve is opened.

The first coefficient $K_1$ and the second coefficient $K_2$ in the equation (1) will be described with reference to FIGS. 2 to 5. FIGS. 2 and 3 are conceptual diagrams showing a flow passage cross section 63h of the discharge valve 63 after the discharge valve 63 is opened. The flow passage cross section 63h can also be referred to as a discharge port of the discharge valve 63. In each of FIGS. 2 and 3, a portion without hatching represents a ratio of anode off-gas in the flow passage cross section 63*h* of the discharge valve 63 and a hatched portion represents a ratio of water in the flow passage cross section 63*h* of the discharge valve 63. In each of FIGS. 2 and 3, an area of the portion without hatching represents the effective cross-sectional area for the anode off-gas, of the area of the flow passage cross section 63*h* (hereinafter, also referred to as "flow passage cross-sectional area"). There are cases where only anode off-gas flows in the flow passage cross section 63*h* and 100% of the flow passage cross section is made up by the anode off-gas as shown in FIG. 2, and where water and anode off-gas flow in the flow passage cross section 63*h* and, for example, about 40% of the flow passage cross-sectional area is made up by water and about 60% of the flow passage cross-sectional area is made up by the anode off-gas as shown in FIG. 3. The first coefficient $K_1$ and the second coefficient $K_2$ are coefficients each indicating the ratio of the flow passage cross-sectional area made up by the anode off-gas, which is obtained by subtracting the ratio of the flow passage cross-sectional area made up by water. As the first coefficient $K_1$ and the second coefficient $K_2$ increase, the ratio of the flow passage cross-sectional area in which anode off-gas flows increases, and thus, the effective cross-sectional area for the anode off-gas increases.

The first coefficient $K_1$ will be described in detail. The inventors have found that not all the water generated based on the power generation by the fuel cell stack 10 flows into the gas-liquid separator 62 but part of the water may remain in the discharge flow passage and the like. The water remaining in the discharge flow passage and the like includes water remaining in the discharge flow passage on the upstream side of the discharge valve 63, the water remaining on various components on the upstream side of the discharge valve 63 in the fuel cell system 100, such as the fuel cell stack 10, and condensation water adhering to the components. In addition, the inventors have found that the amount of water remaining in the discharge flow passage and the like differs depending on the differential pressure.

Figure 4:
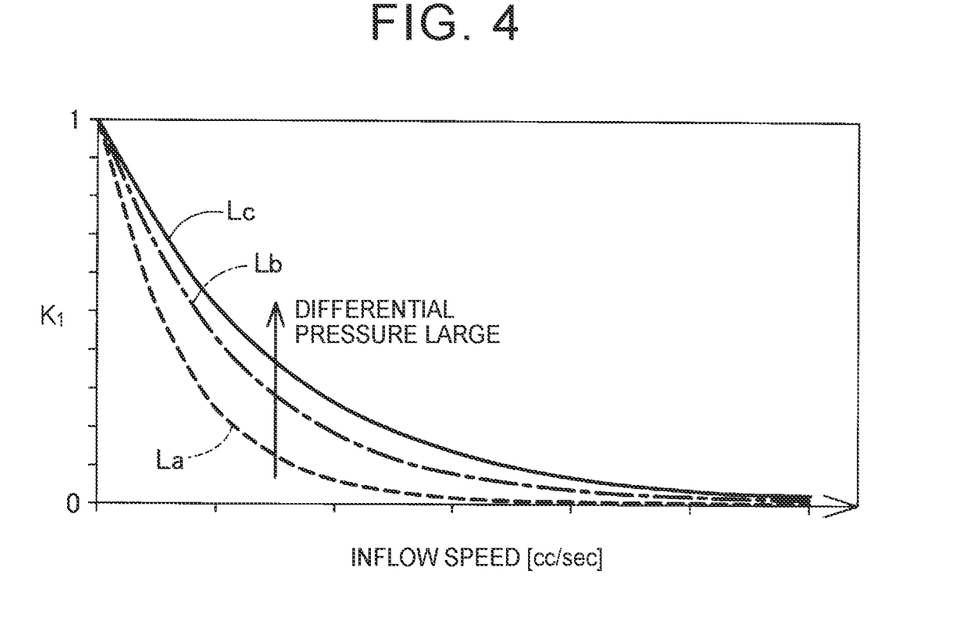
FIG. 4 is a diagram showing a relationship between an inflow speed of water and a first coefficient for each differential pressure.

FIG. 4 is a diagram showing a relationship between an inflow speed of water flowing into the gas-liquid separator 62, the differential pressure, and the first coefficient $K_1$ (hereinafter, referred to as "first relationship"). Graphs La, Lb, and Lc in FIG. 4 respectively show the relationships between the inflow speed of water and the first coefficient $K_1$ when the differential pressure between the first pressure value $P_1$ and the second pressure value $P_2$ is $P_a$, $P_b$, and $P_c$. The differential pressure become larger in the order of $P_a$, $P_b$, and $P_c$. The first coefficient $K_1$ is a coefficient corresponding to the ratio of the flow passage cross-sectional area of the discharge valve 63, in which the anode off-gas flows, and is estimated using the inflow speed of water flowing into the gas-liquid separator 62 from the discharge flow passage and the differential pressure. The inflow speed can be calculated using the amount of generated water based on the amount of electric power generated by the fuel cell stack 10. The amount of electric power generated can be calculated from an output current value of the fuel cell stack 10 obtained from the current sensor 83. The first relationship can be obtained by experiments and simulations in consideration of configurations and arrangement of various components in the fuel cell system 100. As shown in FIG. 4, the first coefficient $K_1$ decrease as the inflow speed increases. This is because, as the inflow speed increases, the amount of water flowing into the gas-liquid separator 62 increases and the ratio of water in the flow passage cross-sectional area increases. Further, the first coefficient $K_1$ increases as the differential pressure increases. This is because a force to push out water increases as the differential pressure increases. In the estimation process, estimation accuracy of the anode off-gas discharge amount can be improved by estimating the effective cross-sectional area for the anode off-gas using the first coefficient $K_1$.

Figure 5:
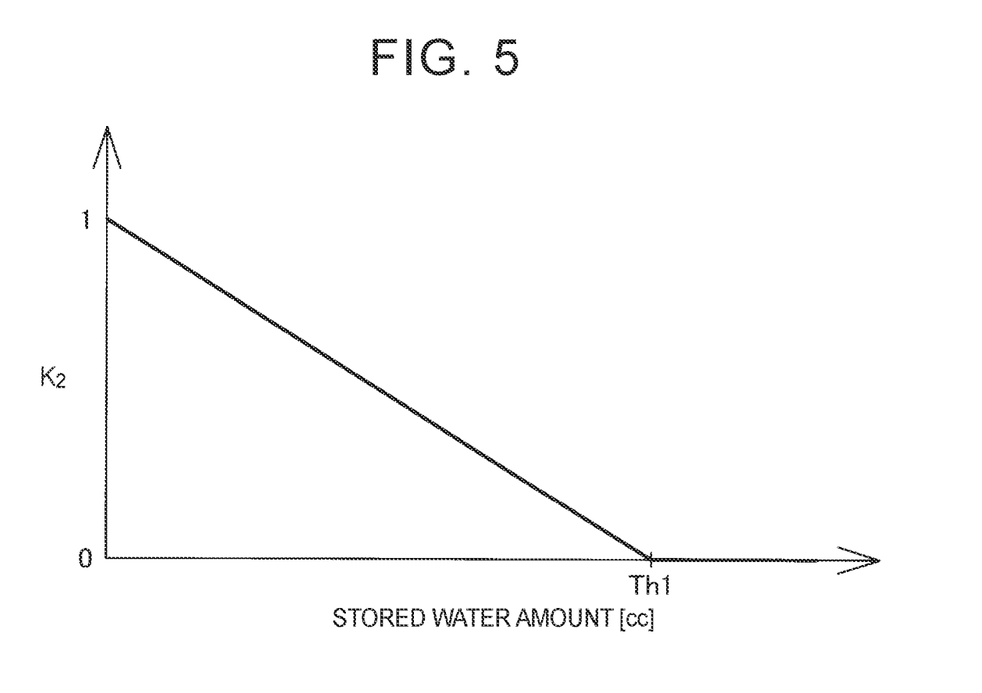
FIG. 5 is a diagram showing a relationship between an amount of stored water in a gas-liquid separator and a second coefficient.

Next, the second coefficient $K_2$ will be described in detail. The inventors have found that there are cases in which, when the discharge valve 63 is opened, anode off-gas is discharged together with the stored water in the gas-liquid separator 62 regardless of whether all the stored water in the gas-liquid separator 62 is discharged. FIG. 5 is a diagram showing a relationship between the amount of the stored water in the gas-liquid separator 62 and the second coefficient $K_2$ (hereinafter, referred to as "second relationship"). The second coefficient $K_2$ is a coefficient corresponding to the ratio of the flow passage cross-sectional area of the discharge valve 63, in which the anode off-gas flows, and is estimated using the amount of the stored water in the gas-liquid separator 62. The second relationship can be obtained by experiments and simulations in consideration of the configurations and the arrangement of various components in the fuel cell system 100. When the amount of the stored water is equal to or larger than a threshold Th1 shown in FIG. 5, anode off-gas does not flow even with the discharge valve 63 being opened, and thus, the second coefficient $K_2$ becomes zero. When the amount of the stored water becomes equal to or smaller than the threshold Th1, the anode off-gas flows out together with the stored water with the discharge valve 63 being opened. As the amount of the stored water decreases below the threshold Th1, the second coefficient $K_2$ increases. In the estimation process, by estimating the effective cross-sectional area for the anode off-gas using the second coefficient $K_2$ in addition to the first coefficient $K_1$, it is possible to further improve the estimation accuracy of the anode off-gas discharge amount.

An example of a method of obtaining the amount of the stored water in the gas-liquid separator 62 for calculating the second coefficient $K_2$ will be described. The amount of stored water at a certain point in time can be calculated using, for example, the amount of electric power generated by the fuel cell stack 10 and the speed at which the stored water in the gas-liquid separator 62 is discharged from the gas-liquid separator 62, which is associated with the differential pressure. Specifically, the control unit 21 uses the amount of generated water based on the power generation amount calculated from the output current value of the fuel cell stack 10, which is obtained from the current sensor 83, to calculate a speed V1 of the water flowing into the gas-liquid separator 62 based on the power generation of the fuel cell stack 10. At this time, the temperature $T_0$ of the fuel cell stack 10 obtained from the temperature sensor 77 may be taken into consideration. Further, the control unit 21 calculates a speed V2 at which the stored water is discharged using a predetermined relationship between the differential pressure and the speed at which the stored water is discharged from the gas-liquid separator 62. Then, by subtracting the speed V2 from the speed V1, a water retaining speed of the gas-liquid separator 62 is calculated to calculate an amount of water retained per unit time. By adding the amounts of water retained per unit time and the amount of water retained before calculating the current amount of the stored water, the current amount of the stored water can be calculated. In another embodiment, a sensor for measuring the amount of stored water may be provided on the gas-liquid separator 62 to measure the amount of stored water with the sensor. The control unit 21 may obtain the second coefficient $K_2$ using the second relationship and a value obtained from the sensor for measuring the amount of stored water.

Figure 6:
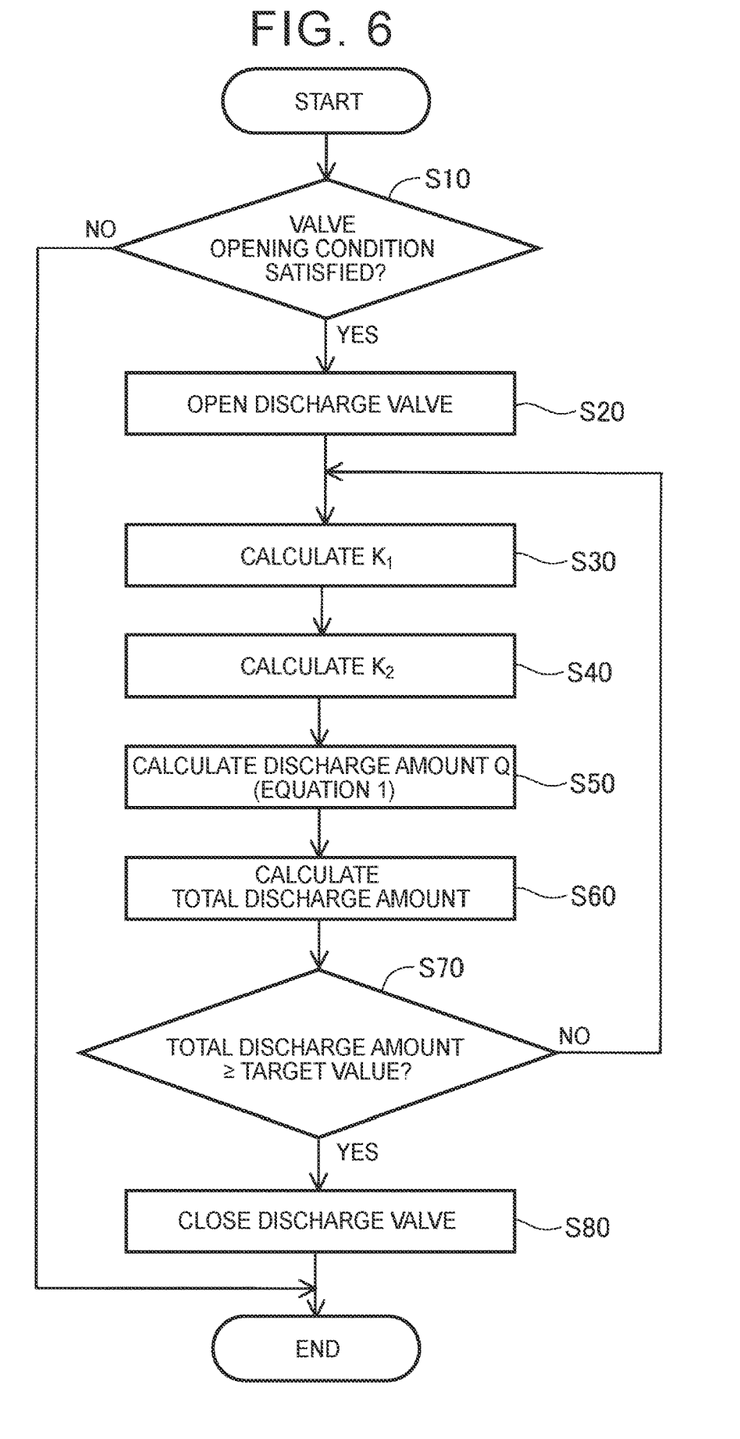
FIG. 6 is a flowchart showing an opening/closing process for the discharge valve.

FIG. 6 is a flowchart showing an opening/closing process for the discharge valve 63 performed by the control unit 21. The opening/closing process is repeatedly performed during a startup of the fuel cell system 100. In step S10, the control unit 21 determines whether any of the above-described opening conditions for the discharge valve 63 is satisfied. When any of the valve opening conditions is satisfied, the control unit 21 causes the process to proceed to step S20 and opens the discharge valve 63. When no valve opening condition is satisfied, the control unit 21 exits the routine.

In steps S30 to S70, the estimation process of estimating the anode off-gas discharge amount is performed. In step S30, the control unit 21 obtains the differential pressure between the upstream side and the downstream side of the discharge valve 63, and calculates the first coefficient $K_1$ using the first relationship described with reference to FIG. 4. In step S40, the control unit 21 calculates the amount of the stored water in the gas-liquid separator 62, and calculates the second coefficient $K_2$ using the second relationship described with reference to FIG. 5. Step S30 and step S40 may be performed simultaneously. Alternatively, the order of step S30 and step S40 may be interchanged.

After calculating the first coefficient $K_1$ and the second coefficient $K_2$, the control unit 21 calculates the anode off-gas discharge amount Q per unit time using the equation (1) in step S50. By using the equation (1), the flow passage cross-sectional area A is multiplied by the first coefficient $K_1$ and the second coefficient $K_2$. That is, in the present embodiment, by calculating the anode off-gas discharge amount Q per unit time using the equation (1), the effective cross-sectional area is estimated at the same time. In another embodiment, the effective cross-sectional area may be obtained by multiplying the flow passage cross-sectional area A by the first coefficient $K_1$ and the second coefficient $K_2$ in advance.

In step S60, the control unit 21 calculates the total discharge amount of the anode off-gas by adding up the anode off-gas discharge amounts Q per unit time since the discharge valve 63 is opened in step S20. In step S70, when the total discharge amount of the anode off-gas is smaller than the target value, the control unit 21 causes the process to return to step S30 and repeats the estimation process. When the total discharge amount of the anode off-gas is equal to or larger than the target value, the control unit 21 causes the process to proceed to step S80 and closes the discharge valve 63.

In this mode, the control unit 21 estimates the effective cross-sectional area of the discharge valve 63 for the anode off-gas based on the differential pressure between the upstream side and the downstream side of the discharge valve 63, and estimates the anode off-gas discharge amount using the estimated effective cross-sectional area. The effective cross-sectional area is decreased by the amount of water flowing into the gas-liquid separator 62 and flowing out from the discharge valve 63. Thus, the anode off-gas discharge amount is calculated in consideration of water remaining in the discharge flow passage and the like on the upstream side of the discharge valve 63, so that the estimation accuracy of the anode off-gas discharge amount can be improved.

In this mode, the effective cross-sectional area for the anode off-gas can be estimated using the first coefficient $K_1$ corresponding to the ratio of the area in which the anode off-gas flows, which is estimated using the differential pressure and the speed of the water flowing into the gas-liquid separator 62.

In this mode, since the estimation accuracy of the anode off-gas discharge amount is improved, it is possible to restrain the estimated anode off-gas discharge amount from becoming larger or smaller than the actual discharge amount. Thus, it is possible to restrain the discharge valve 63 from closing with the concentration of impurities such as nitrogen in the anode gas used for the power generation reaction being higher than the target concentration due to the fact that the actual discharge amount is smaller than the estimated anode off-gas discharge amount. As a result, deterioration of the fuel cell 11 can be suppressed. Further, it is possible to restrain anode gas from being excessively discharged due to the fact that the actual discharge amount is larger than the estimated anode off-gas discharge amount.

In this mode, the effective cross-sectional area for the anode off-gas is estimated by obtaining the first coefficient $K_1$ and the second coefficient $K_2$ that is estimated using the amount of the stored water in the gas-liquid separator 62, and the anode off-gas discharge amount is estimated using the estimated effective cross-sectional area. Thus, the fact that the stored water in the gas-liquid separator 62 is discharged together with the anode off-gas is taken into consideration, so that the estimation accuracy of the anode off-gas discharge amount can be further improved.

In this mode, the estimation process is continuously performed from the time when the discharge valve 63 is opened to the time when the discharge valve 63 is closed. Therefore, the anode off-gas discharge amount is estimated taking into consideration the amount of the anode off-gas discharged together with the stored water in the gas-liquid separator 62 before the discharge of the stored water in the gas-liquid separator 62 is completed. Thus, it is possible to improve the estimation accuracy of the anode off-gas discharge amount, compared with the case in which the anode off-gas discharge amount is calculated after the discharge of the stored water in the gas-liquid separator 62 is completed.

In this mode, the discharge valve 63 is closed when the estimated total discharge amount of the anode off-gas becomes equal to or larger than the target value after the discharge valve 63 is opened. Therefore, the target amount of anode off-gas can be discharged.

2. Second Embodiment

Figure 7:
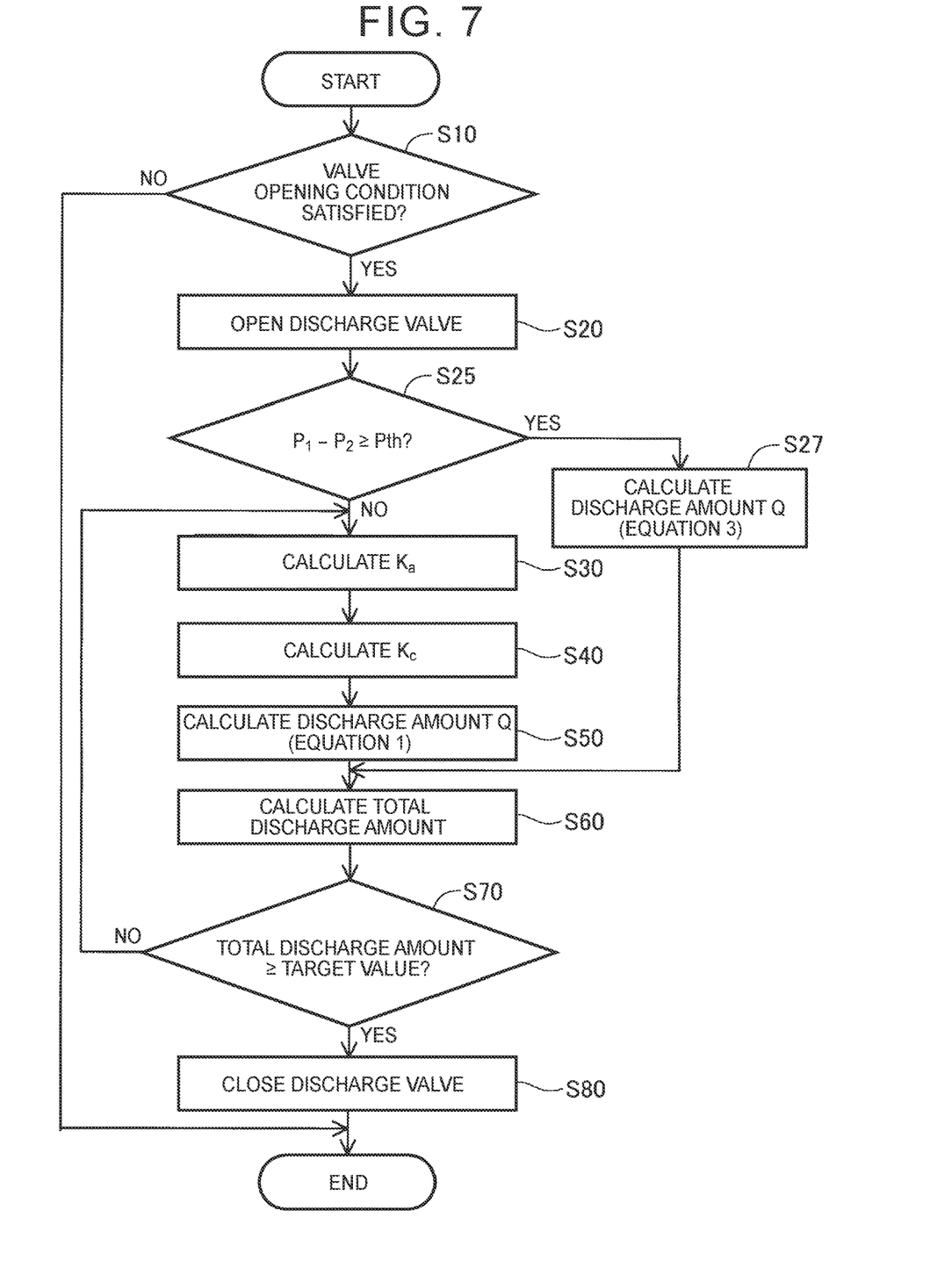
FIG. 7 is a flowchart showing an opening/closing process for the discharge valve according to a second embodiment.

FIG. 7 is a flowchart showing an opening/closing process for the discharge valve 63 according to a second embodiment. The opening/closing process of the second embodiment differs from that of the first embodiment (see FIG. 6) in that step S25 is provided between step S20 and step S30 and step S27 is performed when an affirmative determination is made in step S25. In the second embodiment, the process performed in steps S25, S27, S30, S40, S50, S60, and S70 corresponds to the estimation process.

In step S25, the control unit 21 determines whether the differential pressure is equal to or higher than a predetermined threshold Pth.

Figure 8:
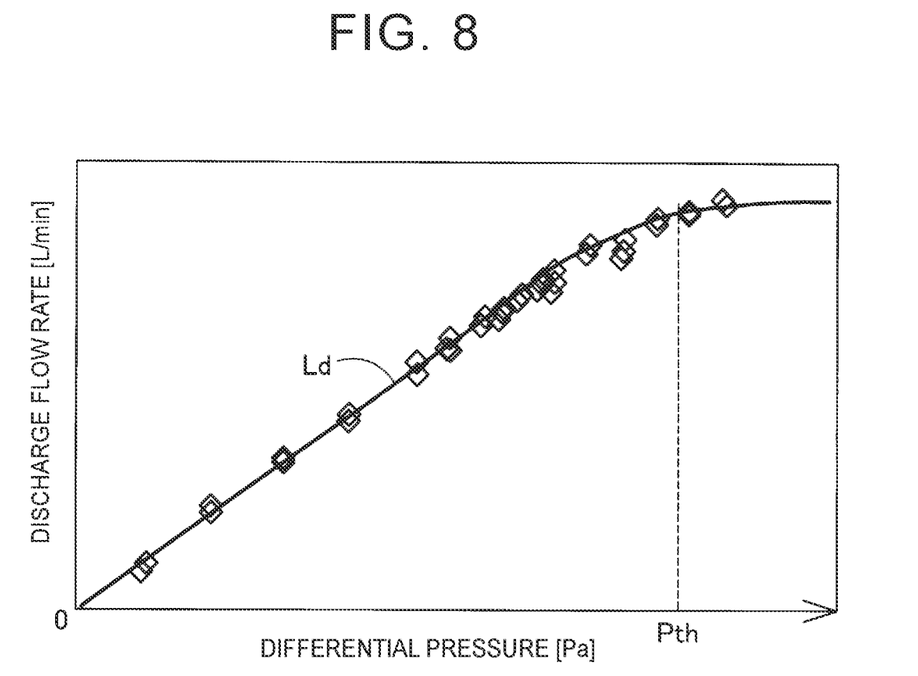
FIG. 8 is a diagram showing a relationship between the differential pressure and an anode off-gas discharge amount per unit time.

FIG. 8 is a diagram showing a relationship between the differential pressure and the anode off-gas discharge amount per unit time. Plots in FIG. 8 are measurement values of the anode off-gas discharge amount per unit time when the differential pressure is varied in the fuel cell system 100. A solid line Ld in FIG. 8 is a graph derived from experimental data and showing the relationship between the differential pressure and the anode off-gas discharge amount per unit time. As is clear from FIG. 8, the anode off-gas discharge amount per unit time increases with an increase in the differential pressure until the differential pressure reaches the threshold Pth. That is, the differential pressure and the anode off-gas discharge amount per unit time have a proportional relationship. When the differential pressure becomes equal to or higher than the threshold Pth, the anode off-gas discharge amount per unit time shows a substantially constant value regardless of the differential pressure. That is, when the differential pressure is equal to or higher than the threshold Pth, the anode off-gas discharge amount per unit time is less likely to be affected by the differential pressure. Thus, in the present embodiment, based on whether the differential pressure is lower than the threshold Pth or the differential pressure is equal to or higher than the threshold Pth, a physical formula for estimating the anode off-gas discharge amount Q per unit time is switched between the equation (1) using the first coefficient $K_1$ associated with the differential pressure and an equation that is not associated with the differential pressure. Therefore, the estimation accuracy of the anode off-gas discharge amount is improved.

With reference to FIG. 7, when the differential pressure is lower than the threshold Pth (step S25, NO), the control unit 21 uses the equation (1) in the first embodiment to calculate the anode off-gas discharge amount Q per unit time, and then, the total discharge amount of the anode off-gas is calculated (see steps S30 to S70). When the differential pressure is equal to or higher than the threshold Pth (step S25, YES), the control unit 21 calculates, in step S27, the anode off-gas discharge amount Q per unit time by the following equation (3) using the flow passage cross-sectional area A as the effective cross-sectional area for the anode off-gas. The threshold Pth is also referred to as "critical differential pressure".

$$Q = \frac{AP_1}{\sqrt{RT_0}} H2 \qquad \text{Equation (3)}$$

In the above equation (3), H2 is a correction term that varies depending on the gas properties of the anode off-gas in the case where the differential pressure is equal to or higher than the threshold Pth. In the present embodiment, H2 is calculated by the following equation (4). In another embodiment, H2 may be 1.

$$H2 = \sqrt{\frac{2\gamma}{\gamma-1}\left[\left\{\left(\frac{2}{\gamma+1}\right)^{\frac{\gamma}{\gamma-1}}\right\}^{\frac{2}{\gamma}} - \left\{\left(\frac{2}{\gamma+1}\right)^{\frac{\gamma}{\gamma-1}}\right\}^{\frac{\gamma+1}{\gamma}}\right]} \qquad \text{Equation (4)}$$

The control unit 21 calculates the anode off-gas discharge amount Q per unit time by the equation (3), and causes the process to proceed to step S70. The other steps in the opening/closing process and the estimation process in the second embodiment are the same as those in the first embodiment, and thus, description thereof will be omitted.

Figure 9:
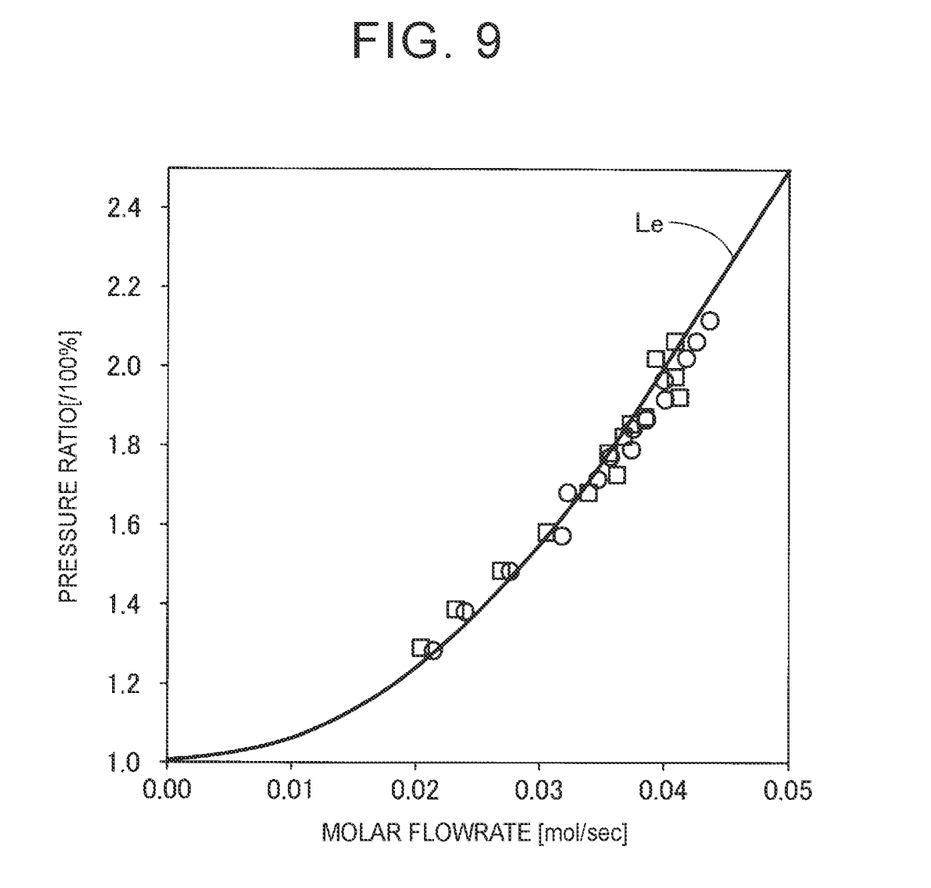
FIG. 9 is a diagram for comparing experimental data and physical formulae.

FIG. 9 is a diagram showing a relationship between the anode off-gas discharge amount per unit time and a pressure ratio. The pressure ratio is a value of the first pressure value $P_1$ with respect to the second pressure value $P_2$. Plots in FIG. 9 are measurement values of the anode off-gas discharge amount per unit time when the pressure ratio is varied in the fuel cell system 100. A solid line Le in FIG. 9 indicates the anode off-gas discharge amount per unit time obtained by the equations (1) and (3) when the pressure ratio is varied. When deriving the solid line Le, the equation (1) is used when the differential pressure is lower than the threshold Pth, and the equation (3) is used when the differential pressure is equal to or higher than the threshold Pth. As shown in FIG. 9, experimental data and the anode off-gas discharge amount per unit time calculated by the equations (1) and (3) agree well. That is, it is shown that the anode off-gas discharge amount can be accurately estimated by using the equation (1) associated with the differential pressure when the differential pressure is lower than the threshold Pth and using the equation (3) not associated with the differential pressure when the differential pressure is equal to or higher than the threshold Pth.

In this mode, when the differential pressure is lower than the predetermined threshold Pth, the equation (1) for estimating the effective cross-sectional area for the anode off-gas using the first coefficient $K_1$ associated with the differential pressure is used to estimate the anode off-gas discharge amount, and when the differential pressure is equal to or higher than the threshold Pth, the equation (3) that does not take the differential pressure into consideration and defines the flow passage cross-sectional area A of the discharge valve 63 as the effective cross-sectional area for the anode off-gas is used to estimate the anode off-gas discharge amount. Thus, it is possible to restrain the estimated anode off-gas discharge amount from becoming larger than the actual discharge amount when the differential pressure is equal to or higher than the threshold Pth, compared to the case where the anode off-gas discharge amount is calculated as an amount that increases in proportion to the differential pressure. Therefore, the estimation accuracy of the anode off-gas discharge amount can be further improved.

3. Other Embodiments

In the second embodiment, the control unit 21 may calculate the anode off-gas discharge amount per unit time using the equation (1) to perform the opening/closing process, obtain an upper limit differential pressure within the range in which the deterioration of the fuel cell 11 is suppressed, and define the upper limit differential pressure as the threshold Pth. Also in this mode, the same effects as those in the second embodiment can be obtained.

In the above embodiments, the control unit 21 may determine that the discharge of the stored water in the gas-liquid separator 62 has been completed, with a sensor provided on the gas-liquid separator 62, for example. The control unit 21 may estimate, after the discharge of the stored water in the gas-liquid separator 62 is completed, the effective cross-sectional area for the anode off-gas by correcting the flow passage cross-sectional area with the first coefficient $K_1$ associated with the differential pressure rather than with the second coefficient $K_2$ associated with the amount of the stored water in the gas-liquid separator 62. Also in this mode, the anode off-gas discharge amount is calculated in consideration of the water remaining in the discharge flow passage and the like on the upstream side of the discharge valve 63. Therefore, the estimation accuracy of the anode off-gas discharge amount can be improved.

In the above embodiments, the circulation pipe 64 and the anode gas pump 65 in the anode gas supply/discharge unit 50 need not be necessarily provided. That is, the configuration of the fuel cell system 100 may be a configuration in which the anode off-gas is not circulated.

Of various controls and processes performed by the control unit 21, processes other than the estimation process may be performed by functional units other than the control unit 21. For example, the CPU included in the control device 20 may deploy the program stored in the memory to function as an opening/closing process performing unit. Alternatively, processes other than the estimation process may be performed by another ECU included in the fuel cell system 100.

In the above embodiment, the fuel cell system 100 is mounted on the vehicle 110. However, the fuel cell system 100 may be mounted on a moving body other than the vehicle 110, such as a ship, a train, and a robot, or may be a system of a stationary type.

The present disclosure is not limited to the above-described embodiments, and can be implemented in various configurations without departing from the scope thereof. For example, the embodiments corresponding to technical features in the configurations described in the SUMMARY and technical features in other embodiments may be appropriately replaced or combined, in order to solve some or all of the above-described issues or in order to achieve some or all of the effects described above. In addition, unless stated as essential in the present specification, the technical features may be deleted as appropriate.

What is claimed is:

1. A fuel cell system comprising:
    a fuel cell configured to be supplied with anode gas and cathode gas to generate electric power;
    a supply flow passage connecting a supply source of the anode gas with the fuel cell and configured such that the anode gas flows through the supply flow passage;
    a discharge flow passage connected to the fuel cell and configured such that the fuel cell communicates with an outside of the fuel cell system through the discharge flow passage and anode off-gas discharged from the fuel cell flows through the discharge flow passage;
    a gas-liquid separator provided on the discharge flow passage and configured to separate water from the anode off-gas and store the water;
    a discharge valve provided on a portion of the discharge flow passage, which is downstream of the gas-liquid separator, and having a predetermined flow passage cross-sectional area when the discharge valve is opened;
    a differential pressure detection unit configured to detect a differential pressure between an upstream side and a downstream side of the discharge valve; and
    a control unit configured to perform an estimation process of estimating an effective cross-sectional area of the discharge valve for the anode off-gas based on the differential pressure and estimating a discharge amount of the anode off-gas discharged from the discharge valve based on the effective cross-sectional area, the effective cross-sectional area being decreased by an amount of water flowing into the gas-liquid separator and flowing out from the discharge valve.

2. The fuel cell system according to claim 1, wherein the control unit is configured to
    obtain a first coefficient for correcting the flow passage cross-sectional area based on a predetermined first relationship among a speed of water flowing into the gas-liquid separator from the discharge flow passage, which is calculated based on an amount of electric power generated by the fuel cell, the differential pressure, and a ratio of the flow passage cross-sectional area in which the anode off-gas flows, and
    estimate the effective cross-sectional area by correcting the flow passage cross-sectional area with the first coefficient.

3. The fuel cell system according to claim 2, wherein the control unit is configured to
    obtain a second coefficient for correcting the flow passage cross-sectional area based on a predetermined second relationship between an amount of water stored in the gas-liquid separator and the ratio of the flow passage cross-sectional area in which the anode off-gas flows, and
    estimate the effective cross-sectional area by correcting the flow passage cross-sectional area with the first coefficient and the second coefficient.

4. The fuel cell system according to claim 3, wherein the control unit is configured to calculate the amount of water stored in the gas-liquid separator based on the amount of electric power generated by the fuel cell and a discharge speed at which the water stored in the gas-liquid separator is discharged from the gas-liquid separator, the discharge speed being associated with the differential pressure.

5. The fuel cell system according to claim 1, wherein the control unit is configured to estimate the discharge amount of the anode off-gas using the flow passage cross-sectional area as the effective cross-sectional area when the differential pressure is equal to or higher than a predetermined threshold in the estimation process.

6. The fuel cell system according to claim 1, wherein the control unit is configured to continuously perform the estimation process from a time when the discharge valve is opened to a time when the discharge valve is closed.

7. The fuel cell system according to claim 1, wherein the control unit is configured to close the discharge valve when a total of the estimated discharge amount of the anode off-gas becomes equal to or larger than a target value after the discharge valve is opened.

8. A method for estimating a discharge amount of anode off-gas in a fuel cell system, the fuel cell system including
    a fuel cell configured to be supplied with anode gas and cathode gas to generate electric power,
    a supply flow passage connecting a supply source of the anode gas with the fuel cell and configured such that the anode gas flows through the supply flow passage,
    a discharge flow passage connected to the fuel cell and configured such that the fuel cell communicates with an outside of the fuel cell system through the discharge flow passage and anode off-gas discharged from the fuel cell flows through the discharge flow passage,
    a gas-liquid separator provided on the discharge flow passage and configured to separate water from the anode off-gas and store the water,
    a discharge valve provided on a portion of the discharge flow passage, which is downstream of the gas-liquid separator, and having a predetermined flow passage cross-sectional area when the discharge valve is opened, the method comprising:
    obtaining a differential pressure between an upstream side and a downstream side of the discharge valve; and
    estimating an effective cross-sectional area of the discharge valve for the anode off-gas based on the differential pressure and estimating a discharge amount of the anode off-gas discharged from the discharge valve based on the effective cross-sectional area, the effective cross-sectional area being decreased by an amount of water flowing into the gas-liquid separator and flowing out from the discharge valve.

* * * * *